United States Patent
Nadolski

(10) Patent No.: US 8,707,083 B2
(45) Date of Patent: Apr. 22, 2014

(54) VIRTUALIZED CLUSTER COMMUNICATION SYSTEM

(75) Inventor: Edmund Nadolski, Trial Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 685 days.

(21) Appl. No.: 12/959,374

(22) Filed: Dec. 3, 2010

(65) Prior Publication Data

US 2012/0144229 A1 Jun. 7, 2012

(51) Int. Cl.
*G06F 11/00* (2006.01)

(52) U.S. Cl.
USPC .............................. 714/4.1; 718/100; 709/223

(58) Field of Classification Search
USPC ...................... 714/4.2, 4.1; 718/100; 709/223
See application file for complete search history.

(56) References Cited

U.S. PATENT DOCUMENTS

| | | | |
|---|---|---|---|
| 7,058,846 B1 * | 6/2006 | Kelkar et al. ................... | 714/4.4 |
| 7,469,279 B1 * | 12/2008 | Stamler et al. ................. | 709/221 |
| 7,577,959 B2 | 8/2009 | Nguyen et al. | |
| 7,734,947 B1 * | 6/2010 | Frangioso et al. .............. | 714/4.1 |
| 7,962,647 B2 * | 6/2011 | Suri et al. ...................... | 709/238 |
| 8,381,217 B1 * | 2/2013 | Wijayaratne et al. ......... | 718/102 |
| 8,468,521 B2 * | 6/2013 | Pawlowski ........................ | 718/1 |
| 8,495,412 B2 * | 7/2013 | Pafumi et al. ................... | 714/4.1 |
| 2005/0159927 A1 * | 7/2005 | Cruz et al. ....................... | 702/188 |
| 2005/0204040 A1 * | 9/2005 | Ferri et al. ....................... | 709/225 |
| 2007/0011272 A1 * | 1/2007 | Bakke et al. .................... | 709/217 |
| 2008/0196029 A1 * | 8/2008 | Doty et al. ....................... | 718/101 |
| 2009/0112972 A1 | 4/2009 | Liu | |
| 2009/0113420 A1 | 4/2009 | Pawlowski | |
| 2009/0228883 A1 * | 9/2009 | Gebhart et al. .................... | 718/1 |
| 2009/0265449 A1 * | 10/2009 | Krishnappa et al. ........... | 709/220 |
| 2010/0138828 A1 * | 6/2010 | Hanquez et al. .................... | 718/1 |
| 2011/0252208 A1 * | 10/2011 | Ali et al. ......................... | 711/162 |
| 2011/0307888 A1 * | 12/2011 | Raj et al. ............................ | 718/1 |
| 2011/0320574 A1 * | 12/2011 | Felts ............................. | 709/220 |
| 2012/0059976 A1 * | 3/2012 | Rosenband et al. ............ | 711/103 |
| 2012/0089980 A1 * | 4/2012 | Sharp et al. ....................... | 718/1 |
| 2012/0158938 A1 * | 6/2012 | Shimonishi et al. ........... | 709/223 |
| 2012/0303594 A1 * | 11/2012 | Mewhinney et al. .......... | 707/692 |

* cited by examiner

*Primary Examiner* — Loan L. T. Truong
(74) *Attorney, Agent, or Firm* — Raj Abhyanker, P.C.

(57) ABSTRACT

A method includes executing, in each of a number of nodes of a cluster communication system, a specialized instance of an operating system privileged to control a corresponding hypervisor configured to consolidate one or more VM(s) on a system hardware. The one or more VM(s) is configured to be associated with a non-privileged operating system. The method also includes providing a cluster stack associated with the specialized instance of the operating system on the each of the number of nodes to enable communication between peers thereof in different nodes, and controlling the one or more VM(s) as a cluster resource through the cluster stack.

20 Claims, 5 Drawing Sheets

US 8,707,083 B2

VIRTUALIZED CLUSTER COMMUNICATION SYSTEM

FIELD OF TECHNOLOGY

This disclosure relates generally to virtualized computing systems and, more particularly, to a method, an apparatus and/or a system of realizing a virtualized cluster communication system.

BACKGROUND

Hypervisor-based virtualization may allow for consolidation of multiple virtual machines (VMs) onto a single physical server platform. The increased utilization of the single physical server platform may increase the risk of service loss in the event of a hardware failure at the physical server. Moreover, a software fault associated with the hypervisor may precipitate failure of an entire virtualized computing system. Redundancy may be introduced into the virtualized computing system through introducing a second physical server and executing a copy of the VMs thereon in parallel with the VMs on the primary physical server.

The abovementioned approach to provide redundancy may require continuous replication of the primary VM(s) on the secondary server (e.g., second physical server), which in turn may consume significant Input/Output (I/O) bandwidth, leading to decreased overall performance. Another approach may include VM "live" migration, where a copy of the primary VM is saved and then transferred to the second physical server. The VM may then be restored at the second physical server. This approach may require a virtualized environment at the second physical server identical to that at the primary server. In the event of a severe hardware and/or a software fault at the primary server, the "live" migration service may be disabled.

SUMMARY

Disclosed are a method, an apparatus and/or a system of realizing a virtualized cluster communication system.

In one aspect, a method includes executing, in each of a number of nodes of a cluster communication system, a specialized instance of an operating system privileged to control a corresponding hypervisor configured to consolidate one or more VM(s) on a system hardware. The one or more VM(s) is configured to be associated with a non-privileged operating system. The method also includes providing a cluster stack associated with the specialized instance of the operating system on the each of the number of nodes to enable communication between peers thereof in different nodes, and controlling the one or more VM(s) as a cluster resource through the cluster stack.

In another aspect, a method includes executing, in each of a number of nodes of a cluster communication system, a specialized instance of an operating system privileged to control a corresponding hypervisor configured to consolidate one or more VM(s) on a system hardware. The one or more VM(s) is configured to be associated with a non-privileged operating system. The method also includes controlling the one or more VM(s) as a cluster resource through a cluster stack associated with the specialized instance of the operating system. The cluster stack is provided on the each of the number of nodes to enable communication between peers thereof in different nodes.

Further, the method includes electing a node of the number of nodes as a designated controller of a cluster formed by the number of nodes, and reinstantiating the one or more VM(s) on another node of the number of nodes through the cluster stack upon detection of a failure of the node elected as the designated controller. The designated controller is configured to be a decision maker of the cluster.

In yet another aspect, a virtualized cluster communication system includes a number of nodes. Each node includes a system hardware configured to have one or more VM(s) consolidated thereon through a corresponding hypervisor. The hypervisor is configured to be controlled by a specialized instance of a privileged operating system associated with a control VM also consolidated on the system hardware. The one or more VM(s) is configured to be associated with a non-privileged operating system. The each node further includes a cluster stack associated with the specialized instance of the privileged operating system to enable communication between peers thereof in different nodes. The cluster stack is configured to control the one or more VM(s) as a cluster resource.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, an apparatus and/or a system of realizing a virtualized cluster communication system. Although the present embodiments have been described with reference to specific example embodiments, it will be evident that various modifications and changes may be made to these embodiments without departing from the broader spirit and scope of the various embodiments.

Figure 1:
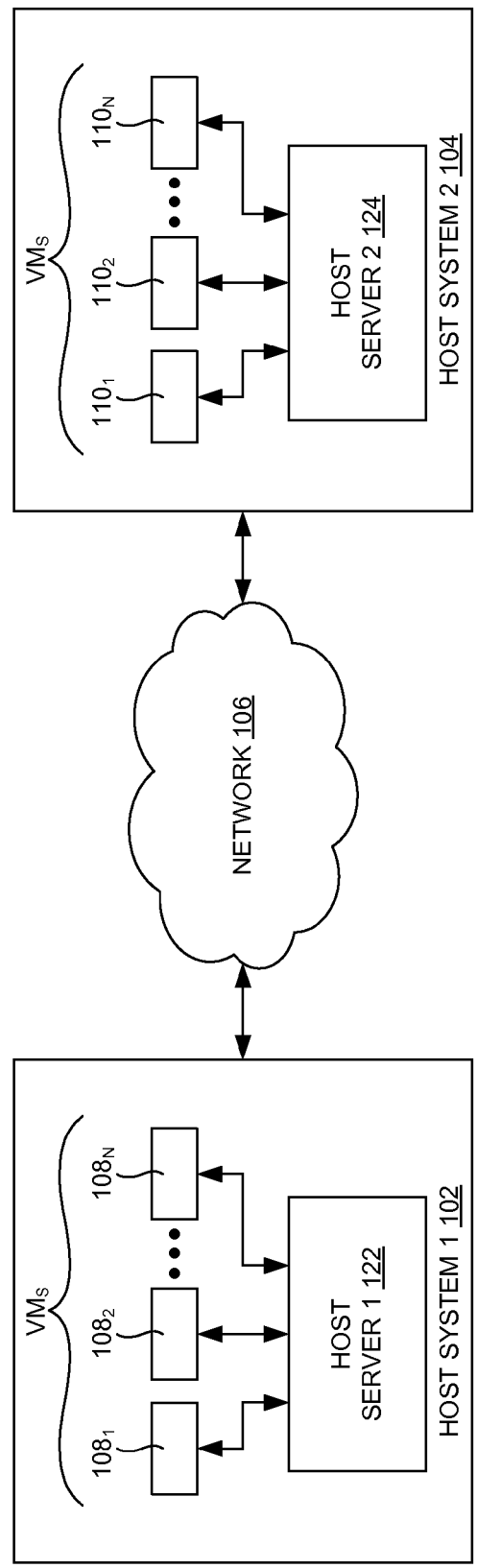
FIG. 1 is a schematic view of replication of virtual machines (VMs) on a host server on another host server, according to one or more embodiments. an audio processing system, according to one or more embodiments.

FIG. 1 shows replication of virtual machines (VMs) (e.g., VMs $108_{1-N}$) on a host server (e.g., host server 1 122) on another host server (e.g., host server 2 124), according to one or more embodiments. In the example embodiment of FIG. 1, host server 1 122 and host server 2 124 may each form host system 1 102 and host system 2 104 respectively with VMs (e.g., VMs $108_{1-N}$ and VMs $110_{1-N}$) associated therewith. Thus, VMs $110_{1-N}$ may be the "replicas" of VMs $108_{1-N}$. In one or more embodiments, communication (e.g., associated with the replication) between host server 1 122 and host server 2 124 may be enabled through network 106. In one or more embodiments, network 106 may be a local area network (LAN), a wide area network (WAN), a virtual private network (VPN), a storage area network (SAN) using communication links over, for example, the Internet, or any combination thereof. In one or more embodiments, when the aforementioned replication is employed to provide redundancy in a virtualized computing environment, the replication may need to be continuous. In one or more embodiments, continuous replication may significantly consume input/output (I/O) bandwidth, and, therefore, may lead to performance reduction.

In one or more embodiments, an existing running instance of one or more VMs (e.g., VMs $108_{1-N}$) on host server 1 122 may be copied onto host server 2 124 across network 106, following which the original running instance may be destroyed. In one or more embodiments, a copy of the VMs on host system 1 102 may be made therein, following which the copy may be migrated (e.g., using VMware®'s VMotion™) to host system 2 104. In one or more embodiments, after the migration, the VMs may be restored on host system 2 104. Here, host server 1 122 serves as the "host" and host server 2 124 serves as the "destination." In one or more embodiments, in order to achieve appropriate redundancy, the virtualized environment at the "destination" may need to be identical to the virtualized environment at the "source." In one or more embodiments, in the event of a severe hardware fault (e.g., a fault with host server 1 122) and/or a software fault (e.g., a fault with the hypervisor configured to enable consolidation of VMs on host server 1 122) at the source, the "live" migration service may be disabled.

Figure 2:
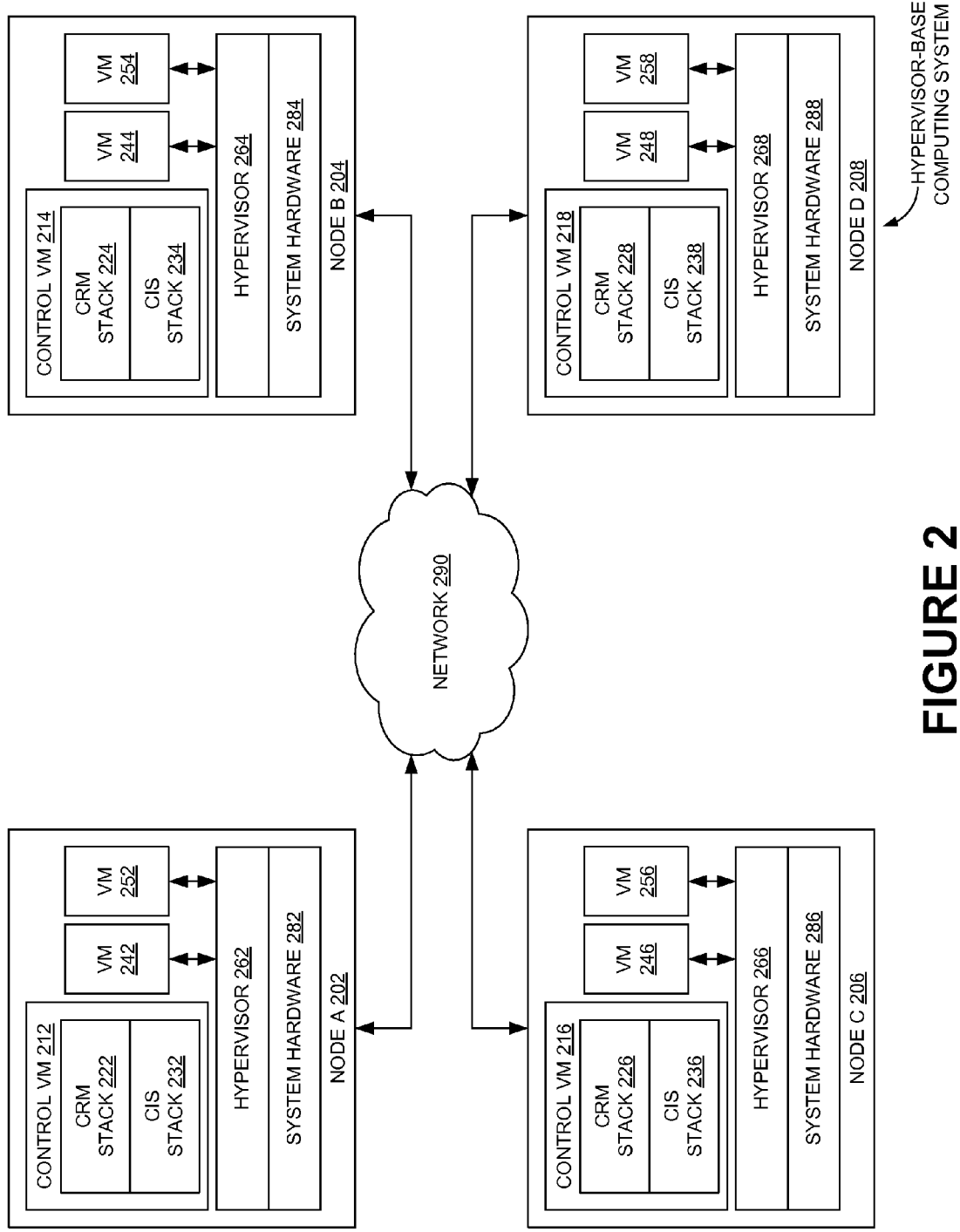
FIG. 2 is a schematic view of a hypervisor-based computing system, according to one or more embodiments.

FIG. 2 shows a hypervisor-based computing system 200, according to one or more embodiments. In one or more embodiments, hardware redundancy in hypervisor-based computing system 200 may be introduced through the addition of one or more host servers or controller boards to an already existing host server or controller board. FIG. 2 merely shows the system hardware (e.g., system hardware 282, system hardware 284, system hardware 286, and system hardware 288) associated with both the one or more host servers/controller boards and the already existing host server/controller board. Here, system hardware 282 is associated with the already existing host server/controller board, and system hardware 284, system hardware 286 and system hardware 288 are associated with the additional one or more host servers/controller boards. In one or more embodiments, each of system hardware 282, system hardware 284, system hardware 286 and system hardware 288 may be analogous to hardware associated with host server 1 122 or host server 2 124.

Figure 3:
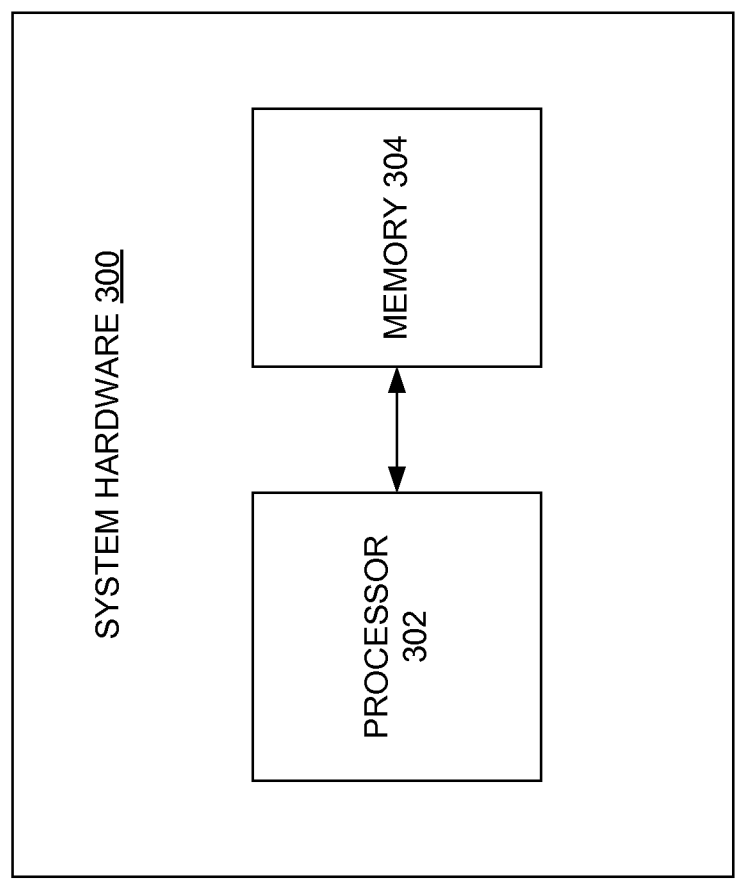
FIG. 3 is a schematic view of a system hardware of the hypervisor-based computing system of FIG. 2, according to one or more embodiments.

FIG. 3 shows system hardware 300, according to one or more embodiments. System hardware 300 may be any one of system hardware 282, system hardware 284, system hardware 286 and system hardware 288. In one or more embodiments, system hardware 300 may include a processor 302 configured to execute instructions associated therewith. In one or more embodiments, system hardware 300 may also include a memory 304 including storage locations configured to be addressable by processor 302.

Referring to FIG. 2, in one or more embodiments, hypervisor 262, hypervisor 264, hypervisor 266 and hypervisor 268 may each be a high level system software executing on a platform associated with system hardware 282, system hardware 284, system hardware 286 and system hardware 288 respectively. For example, each of hypervisor 262, hypervisor 264, hypervisor 266 and hypervisor 268 may be capable of accessing all machine instructions in a processor and/or a memory associated with system hardware 282, system hardware 284, system hardware 286 and system hardware 288 respectively. In one or more embodiments, each of hypervisor 262, hypervisor 264, hypervisor 266 and hypervisor 268 may provide abstraction for one or more operating systems configured to execute on the platform associated with system hardware 282, system hardware 284, system hardware 286 and system hardware 288 respectively.

In one or more embodiments, each of hypervisor 262, hypervisor 264, hypervisor 266 and hypervisor 268 may consolidate VMs (e.g., control VM 212, VM 242 and VM 252 associated with system hardware 282, control VM 214, VM 244 and VM 254 associated with system hardware 284, control VM 216, VM 246 and VM 256 associated with system hardware 286 and control VM 218, VM 248 and VM 258 associated with system hardware 288) on the platform associated with system hardware 282, system hardware 284, system hardware 286 and system hardware 288 respectively. In the example embodiment of FIG. 2, each of the set of VMs, the associated control VM, the associated hypervisor and the associated system hardware may together form a node (e.g., node A 202, node B 204, node C 206, node D 208) of hypervisor-based computing system 200. FIG. 2 shows four nodes merely for example purposes. Two or more nodes may serve to illustrate the concepts associated with the exemplary embodiments discussed herein.

In one or more embodiments, in each node (e.g., A 202, node B 204, node C 206, node D 208), each of the corresponding control VM 212, control VM 214, control VM 216 and control VM 218 may execute a specialized instance of an operating system privileged to control the corresponding set of hypervisor 262, VM 242 and VM 252, hypervisor 264, VM 244 and VM 254, hypervisor 266, VM 246 and VM 256, and hypervisor 268, VM 248 and VM 258 respectively. In one or more embodiments, the aforementioned instances of the privileged operating system may be peer instances, and, according to one or more protocols defined in a set of instructions (e.g., cluster control software) associated with cluster management and/or control configured to execute on the control VMs, a node (e.g., node A 202) may be elected (e.g., through an administrator of the cluster) as the designated controller in a cluster formed by node A 202, node B 204, node C 206 and node D 208.

In one or more embodiments, all decisions associated with the cluster may be made at the designated controller node (e.g., node A 202). In one or more embodiments, if the designated controller fails, one of the additional nodes (e.g., node B 204, node C 206 or node D 208) may be elected (e.g., through the administrator of the cluster) as the designated controller. In one or more embodiments, each of the set of VM 242 and VM 252, VM 244 and VM 254, VM 246 and VM 256, and VM 248 and VM 258 may be associated with a non-privileged operating system, and may execute, for example, user applications/application programs.

In one or more embodiments, hardware redundancy may be added to hypervisor-based computing system 200 through node B 204, node C 206 and node D 208 being coupled to node A 202 through a network 290 (e.g., Internet) analogous to network 106. In one or more embodiments, each of control VM 212, control VM 214, control VM 216 and control VM 218 may have a cluster stack associated therewith (not shown)

configured to each include a corresponding Cluster Resource Manager (CRM) stack and Cluster Infrastructure Services (CIS) stack (e.g., CRM stack 222 and CIS stack 232, CRM stack 224 and CIS stack 234, CRM stack 226 and CIS stack 236, CRM stack 228 and CIS stack 238).

In one or more embodiments, each of CRM stack and CIS stack of a node (e.g., node A 202; the CRM stack and the CIS stack associated therewith being CRM stack 222 and CIS stack 232) may exchange cluster communication messages with the corresponding peers thereof on other nodes (e.g., node B 204, node C 206 and node D 208, and CRM stack 224 and CIS stack 234, CRM stack 226 and CIS stack 236, and CRM stack 228 and CIS stack 238 respectively) through network 290. Here, in one or more embodiments, the CRM stack and the CIS stack on each node may reside on the control VM therein, and may function as in a non-virtualized system. In one or more embodiments, the CRM stack may enable an additional level of abstraction that allows VMs having non-privileged operating systems associated therewith and controlled through a corresponding control VM to be managed as a cluster resource. Here, a "resource" (an example of an abstraction) may execute instances of application programs on a hardware device associated with system hardware 282, system hardware 284, system hardware 286 or system hardware 288.

In one or more embodiments, the CRM stack (e.g., CRM stack 222, CRM stack 224, CRM stack 226 and CRM stack 228) may deploy resource control scripts configured to enable operations on the resource including but not limited to starting, stopping and monitoring. Therefore, in one or more embodiments, the CRM stack may enable control of VMs associated therewith in a way similar to that described above. In other words, in one or more embodiments, the CRM stack may have sufficient privilege(s) to start, stop, and/or monitor the VMs. In one or more embodiments, the VMs may have specific instances of applications and/or programs, which also may be managed in the same way.

In one or more embodiments, the CIS stack (e.g., CIS stack 232, CIS stack 234, CIS stack 236 and CIS stack 238) may provide/expose a set of cluster resource management Application Programming Interfaces (APIs) to the CRM stack (e.g., CRM stack 222, CRM stack 224, CRM stack 226 and CRM stack 228) to enable independence thereof from the underlying cluster infrastructure. Examples of cluster infrastructures available as "open source" include High-Availability Linux (Linux-HA) and OpenAIS. The cluster infrastructure services provided include messaging between nodes (e.g., node A 202 and node B 204) and/or High Availability (HA) services such as Heartbeat services, notifications, cluster memberships, etc. In one or more embodiments, one or more of the aforementioned example cluster infrastructure services may be made "hypervisor-aware," and may be provided without any modifications required therefor.

In one or more embodiments, the VMs executing under the control of the corresponding hypervisor on each instance may possess at least some level of cluster awareness, and may run as a clustered application. In one or more embodiments, the CRM stack may be configured to detect failure of a node associated therewith. For example, the node may panic/fault and all instances of the applications/application programs executing therein may disappear. Then, the CRM stack may reinstantiate the aforementioned instances on another host server/controller board (or, a new designated controller node) in hypervisor-based computing system 200, which is now a cluster. In one or more embodiments, a clustered application associated with the VMs may receive notification(s) through the cluster stack when a node is "disabled" from the cluster and/or when a node is "added" to the cluster.

In one or more embodiments, thus, hypervisor-based computing system 200 may continue to provide service to one or more client devices thereof even in the event of a single hardware fault and/or a software fault (e.g., a fault in the privileged operating system, a hypervisor fault). In one or more embodiments, in the case of hypervisor-based computing system 200 having more than two nodes therein (e.g., see FIG. 2), more than one hardware and/or software fault(s) may be tolerated. Therefore, in one or more embodiments, hypervisor-based computing system 200 is an HA system.

In one or more embodiments, hardware redundancy may be utilized in hypervisor-based computing system 200 through the cluster control software configured to execute on the control VMs. In one or more embodiments, as the VMs associated with one or more non-privileged operating systems may be treated as cluster resources, hypervisor-based computing system 200 may be a system of aggregated "physical" host servers with virtualization capabilities, in contrast to merely being a system of aggregated "physical" host servers. In one or more embodiments, HA capability may be extended to support the VMs associated with the one or more non-privileged operating systems, and to treat the aforementioned VMs as cluster resources.

In one or more embodiments, cluster API services of the cluster stack (e.g., exposed by CIS stack) of the nodes of hypervisor-based computing system 200 may be presented to the "cluster-aware" applications executing in the VMs associated with the one or more non-privileged operating systems. In one or more embodiments, hypervisor-based computing system 200 may also be configured to support VM replication and/or migration.

It is obvious that the number of nodes of hypervisor-based computing system 200 function may be increased/arbitrarily scaled, and that the number of nodes may be dictated merely by factors such as the capacity of the system hardware (e.g., system hardware 282, system hardware 284, system hardware 286 and/or system hardware 288), the capacity of the network (e.g., network 290) switch and the maximum number of nodes that can be managed by the CRM stack.

Figure 4:
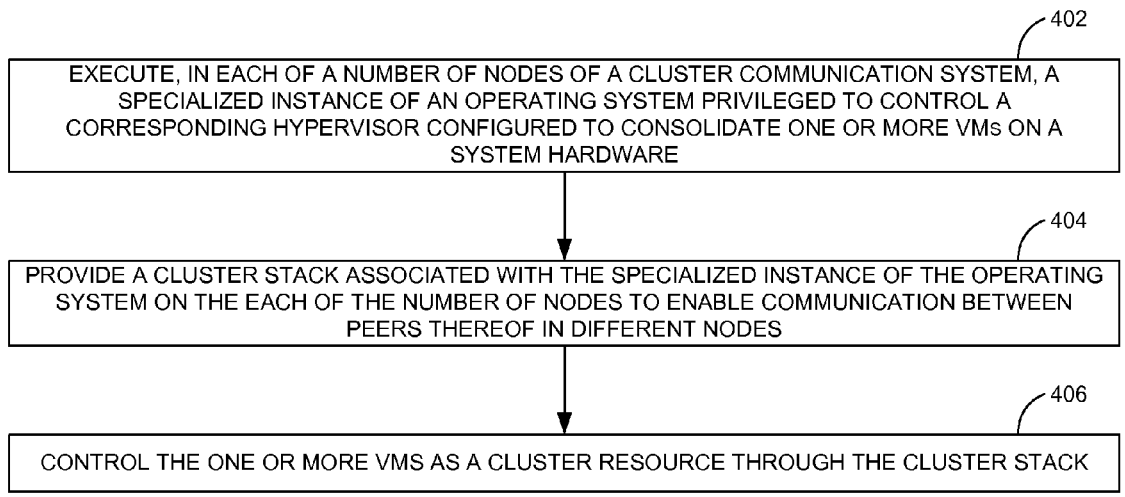
FIG. 4 is a process flow diagram detailing the operations involved in a method of realizing a virtualized cluster communication system, according to one or more embodiments.

FIG. 4 shows a process flow diagram detailing the operations involved in realizing a virtualized cluster communication system (e.g., hypervisor-based computing system 200). In one or more embodiments, operation 402 may involve executing, in each of a number of nodes of a cluster communication system, a specialized instance of an operating system privileged to control a corresponding hypervisor configured to consolidate one or more VM(s) on a system hardware. The one or more VM(s) may be configured to be associated with a non-privileged operating system. In one or more embodiments, operation 404 may involve providing a cluster stack associated with the specialized instance of the operating system on the each of the number of nodes to enable communication between peers thereof in different nodes. In one or more embodiments, operation 406 may involve controlling the one or more VM(s) as a cluster resource through the cluster stack.

Figure 5:
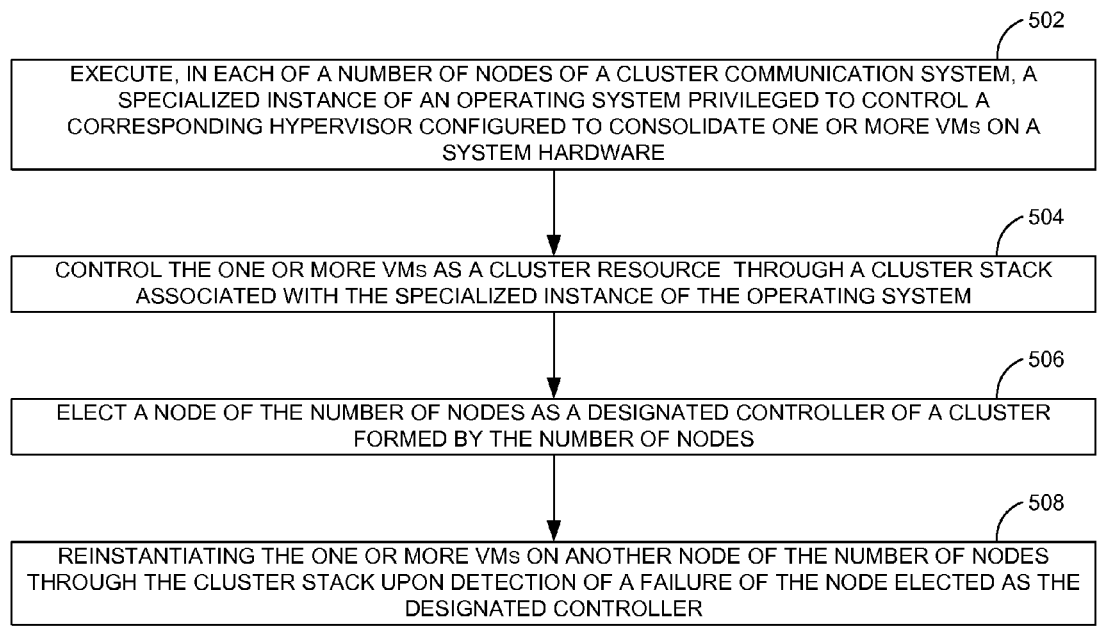
FIG. 5 is a process flow diagram detailing the operations involved in a method of realizing fault-tolerance in a virtualized cluster communication system, according to one or more embodiments.

FIG. 5 shows a process flow diagram detailing the operations involved in a method of realizing fault-tolerance in a virtualized cluster communication system (e.g., hypervisor-based computing system 200). In one or more embodiments, operation 502 may involve executing, in each of a number of nodes of a cluster communication system, a specialized instance of an operating system privileged to control a corresponding hypervisor configured to consolidate one or more VM(s) on a system hardware. The one or more VM(s) may be configured to be associated with a non-privileged operating system.

In one or more embodiments, operation 504 may involve controlling the one or more VM(s) as a cluster resource through a cluster stack associated with the specialized instance of the operating system. The cluster stack may be provided on the each of the number of nodes to enable communication between peers thereof in different nodes. In one or more embodiments, operation 506 may involve electing a node of the number of nodes as a designated controller of a cluster formed by the number of nodes. In one or more embodiments, the designated controller may be configured to be a decision maker of the cluster. In one or more embodiments, operation 508 may then involve reinstantiating the one or more VM(s) on another node of the number of nodes through the cluster stack upon detection of a failure of the node elected as the designated controller.

Although the present embodiments have been described with reference to specific example embodiments, it will be evident that various modifications and changes may be made to these embodiments without departing from the broader spirit and scope of the various embodiments. Also, for example, the various devices and modules described herein may be enabled and operated using hardware circuitry (e.g., CMOS based logic circuitry), firmware, software or any combination of hardware, firmware, and software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Accordingly, the specification and drawings are to be regarded in an illustrative rather than a restrictive sense.

What is claimed is:

1. A method comprising:
   executing, in each of a plurality of nodes of a cluster communication system, a specialized instance of an operating system privileged to control a corresponding hypervisor configured to consolidate at least one virtual machine (VM) on a system hardware, the at least one VM being configured to be associated with a non-privileged operating system;
   providing a cluster stack associated with the specialized instance of the operating system on the each of the plurality of nodes to enable communication between peers thereof in different nodes;
   controlling the at least one VM as a cluster resource through the cluster stack; and
   providing a Cluster Resource Manager (CRM) stack in the cluster stack, the CRM stack being configured to enable controlling the at least one VM as the cluster resource through deploying a resource control script to enable at least one of: starting the at least one VM, stopping the at least one VM and monitoring the at least one VM.

2. The method of claim 1, further comprising executing the specialized instance of the privileged operating system on a control VM on the system hardware associated with the at least one VM consolidated thereon through the corresponding hypervisor.

3. The method of claim 1, further comprising:
   electing a node of the plurality of nodes as a designated controller of a cluster formed by the plurality of nodes, the designated controller being configured to be a decision maker of the cluster; and
   electing another node of the plurality of nodes as the designated controller upon a failure thereof.

4. The method of claim 1, wherein the plurality of nodes is configured to communicate with one another through a computer network.

5. The method of claim 1,
   wherein the system hardware is associated with one of a host server and a controller board.

6. The method of claim 3, further comprising detecting the failure of the node elected as the designated controller through the CRM stack,
   wherein the CRM stack is configured to reinstantiate an instance of at least one of an application and an application program associated with the at least one VM on the another node of the plurality of nodes.

7. The method of claim 1, wherein the cluster stack further comprises a Cluster Infrastructure Services (CIS) stack configured to expose a set of cluster resource management Application Programming Interfaces (APIs) to the CRM stack to enable an independence thereof from an underlying cluster infrastructure.

8. A method comprising:
   executing, in each of a plurality of nodes of a cluster communication system, a specialized instance of an operating system privileged to control a corresponding hypervisor configured to consolidate at least one VM on a system hardware, the at least one VM being configured to be associated with a non-privileged operating system;
   controlling the at least one VM as a cluster resource through a cluster stack associated with the specialized instance of the operating system, the cluster stack being provided on the each of the plurality of nodes to enable communication between peers thereof in different nodes, and the cluster stack comprising a CRM stack configured to enable controlling the at least one VM as the cluster resource through deploying a resource control script to enable at least one of: starting the at least one VM, stopping the at least one VM and monitoring the at least one VM;
   electing a node of the plurality of nodes as a designated controller of a cluster formed by the plurality of nodes, the designated controller being configured to be a decision maker of the cluster; and
   reinstantiating the at least one VM on another node of the plurality of nodes through the cluster stack upon detection of a failure of the node elected as the designated controller.

9. The method of claim 8, further comprising executing the specialized instance of the privileged operating system on a control VM on the system hardware associated with the at least one VM consolidated thereon through the corresponding hypervisor.

10. The method of claim 8, further comprising:
    electing the another node of the plurality of nodes as the designated controller upon a failure thereof.

11. The method of claim 8, wherein the plurality of nodes is configured to communicate with one another through a computer network.

12. The method of claim 8,
    wherein the system hardware is associated with one of a host server and a controller board.

13. The method of claim 8, further comprising detecting the failure of the node elected as the designated controller through the CRM stack,
    wherein the CRM stack is configured to reinstantiate an instance of at least one of an application and an application program associated with the at least one VM on the another node of the plurality of nodes.

14. The method of claim 8, wherein the cluster stack further comprises a CIS stack configured to expose a set of cluster resource management APIs to the CRM stack to enable an independence thereof from an underlying cluster infrastructure.

15. A virtualized cluster communication system comprising:
   a plurality of nodes, each node comprising a system hardware configured to have at least one VM consolidated thereon through a corresponding hypervisor, the hypervisor being configured to be controlled by a specialized instance of a privileged operating system associated with a control VM also consolidated on the system hardware, the at least one VM being configured to be associated with a non-privileged operating system, and the each node further comprising a cluster stack associated with the specialized instance of the privileged operating system to enable communication between peers thereof in different nodes,
   wherein the cluster stack is configured to control the at least one VM as a cluster resource, and
   wherein the cluster stack comprises a CRM stack configured to enable controlling the at least one VM as the cluster resource through deploying a resource control script to enable at least one of: starting the at least one VM, stopping the at least one VM and monitoring the at least one VM.

16. The virtualized cluster communication system of claim 15, wherein the cluster stack is further configured to enable:
   electing a node of the plurality of nodes as a designated controller of a cluster formed by the plurality of nodes, the designated controller being configured to be a decision maker of the cluster, and
   electing another node of the plurality of nodes as the designated controller upon a failure thereof.

17. The virtualized cluster communication system of claim 16, further comprising a computer network configured to enable communication between the each node of the plurality of nodes and the another node of the plurality of nodes,
   wherein the system hardware is associated with one of a host server and a controller board.

18. The virtualized cluster communication system of claim 16, wherein the CRM stack is configured to detect the failure of the node elected as the designated controller.

19. The virtualized cluster communication system of claim 18,
   wherein the CRM stack is further configured to reinstantiate an instance of at least one of an application and an application program associated with the at least one VM on the another node of the plurality of nodes.

20. The virtualized cluster communication system of claim 15, wherein the cluster stack further comprises a CIS stack configured to expose a set of cluster resource management APIs to the CRM stack to enable an independence thereof from an underlying cluster infrastructure.

* * * * *